US012620861B2

(12) United States Patent　　(10) Patent No.:　US 12,620,861 B2
Lorenz et al.　　(45) Date of Patent:　　May 5, 2026

(54) SYNCHRONOUS MACHINE

(71) Applicant: MAHLE International GmbH, Stuttgart (DE)

(72) Inventors: Leonard Lorenz, Stuttgart (DE); Gustavo Esteves Albieri, Murrhardt (DE); Christoph Schmuelling, Leutenbach (DE)

(73) Assignee: Mahle International GmbH (DE)

( * ) Notice: Subject to any disclaimer, the term of this patent is extended or adjusted under 35 U.S.C. 154(b) by 234 days.

(21) Appl. No.: 18/694,952

(22) PCT Filed: Aug. 24, 2022

(86) PCT No.: PCT/EP2022/073572
§ 371 (c)(1),
(2) Date: Mar. 22, 2024

(87) PCT Pub. No.: WO2023/046398
PCT Pub. Date: Mar. 30, 2023

(65) Prior Publication Data
US 2025/0007349 A1　　Jan. 2, 2025

(30) Foreign Application Priority Data

Sep. 24, 2021　(DE) .......................... 102021210674.9

(51) Int. Cl.
*H02K 5/173*　(2006.01)
*F16C 32/04*　(2006.01)
(Continued)

(52) U.S. Cl.
CPC ....... *H02K 5/1732* (2013.01); *F16C 32/0474* (2013.01); *H02K 5/15* (2013.01); *H02K 7/083* (2013.01)

(58) Field of Classification Search
CPC ........ H02K 5/1732; H02K 5/15; H02K 7/083; H02K 19/12; H02K 19/26; H02K 11/0094; F16C 32/0474
See application file for complete search history.

(56) References Cited

U.S. PATENT DOCUMENTS 5,770,909 A * 6/1998 Rosen ..................... H02K 19/12
　　　　　　　　　　　　　　　　　　　　322/89
7,816,828 B2 * 10/2010 Cordes .............. H02K 11/0141
　　　　　　　　　　　　　　　　　　　　336/120

FOREIGN PATENT DOCUMENTS

BG　　　　111823 A　*　4/2016　............. H02K 19/24
DE　　　2234472 A1　　1/1974
(Continued)

OTHER PUBLICATIONS

Machine Translation of WO 2013001559 A1 (Year: 2013).*
(Continued)

*Primary Examiner* — Alexander A Singh
*Assistant Examiner* — Charlie Frank Mann, Jr.
(74) *Attorney, Agent, or Firm* — Fishman Stewart PLLC

(57) ABSTRACT

An inductively electrically excited synchronous machine is disclosed. The synchronous machine includes a stator group with a housing and a stator arranged in the housing and a rotor group with a shaft and a rotor that is non-rotatably connected to the shaft. The rotor group is rotatably arranged about an axis of rotation in the stator of the stator group. A bearing shield and a bearing fixed in the bearing shield are provided. The bearing shield axially closes the housing of the stator group and the bearing rotatably receives the shaft of the rotor group. An energy transmitter with a hollow-cylindrical magnetic core is provided. The magnetic core is arranged radially between the bearing shield and the bearing and partially forms the bearing shield.

20 Claims, 2 Drawing Sheets

(51) Int. Cl.
    *H02K 5/15*        (2006.01)
    *H02K 7/08*        (2006.01)

(56)           References Cited

FOREIGN PATENT DOCUMENTS

| | | | |
|---|---|---|---|
| DE | 102004028595 A1 | 12/2005 | |
| DE | 102017214766 A1 * | 4/2018 | ............. H02K 9/227 |
| EP | 2415143 A1 | 2/2012 | |
| JP | 2010130777 A * | 6/2010 | |
| WO | 2010112139 A1 | 10/2010 | |
| WO | WO-2013001559 A1 * | 1/2013 | ............. H02K 19/12 |
| WO | WO-2018178172 A1 * | 10/2018 | ........... H02K 7/1815 |

OTHER PUBLICATIONS

Machine Translation of WO 2018178172 A1 (Year: 2018).*
Machine Translation of BG 111823 A (Year: 2016).*
Machine Translation of DE 102017214766 A1 (Year: 2018).*
Machine Translation of JP 2010130777 A (Year: 2010).*
English abstract DE-102004028595.

* cited by examiner

SYNCHRONOUS MACHINE

CROSS-REFERENCE TO RELATED APPLICATIONS

This application claims priority to International Patent Application No. PCT/EP2022/073572 filed Aug. 24, 2022, which also claims priority to German Patent Application DE 10 2021 210 674.9 filed Sep. 24, 2021, the contents of each of which is hereby incorporated by reference in its entirety.

TECHNICAL FIELD

The invention relates to an inductively electrically excited synchronous machine.

BACKGROUND

An inductively electrically excited synchronous machine usually comprises a stator and a rotor rotatably arranged in the stator. There, the energy is transmitted to the windings in the rotating rotor by means of an energy transmitter. The energy transmitter comprises a stator-side primary coil and a rotor-side secondary coil, which electromagnetically interact with one another. Further, a stator-side inverter and a rotor-side rectifier are provided. The energy transmitter is arranged outside of a housing of the synchronous machine and disadvantageously requires additional installation space.

SUMMARY

The object of the invention therefore is to state, for a synchronous machine of the generic type, an improved or at least alternative embodiment, with which the described disadvantages are overcome.

According to the invention, this object is achieved through the subject of the independent claim(s). Advantageous embodiments are subject of the dependent claims.

An inductively electrically excited synchronous machine comprises a stator group with a housing and a stator arranged in the housing. In addition, the synchronous machine comprises a rotor group with a shaft and a rotor that is non-rotatably connected to the shaft. The rotor group is rotatably arranged about an axis of rotation in the stator of the stator group. Further, the synchronous machine comprises a bearing shield and a bearing fixed in the bearing shield, wherein the bearing shield axially closes the housing of the stator group and the bearing rotatably receives the shaft of the rotor group. In addition, the synchronous machine comprises an energy transmitter with a hollow cylindrical magnetic core. According to the invention, the magnetic core is arranged radially between the bearing shield and the bearing and partially reproduces the bearing shield.

In connection with the present invention, the terms "axial" and "radial" always relate to the axis of rotation.

The magnetic core is arranged between the bearing shield and the bearing and can be fastened to the bearing shield and/or to the bearing in a materially connected and/or non-positively connected and/or positively connected manner. The magnetic core can support the mechanical loads that occur in the synchronous machine. Through the arrangement of the magnetic core between the bearing shield and the bearing, the installation space required for the energy transmitter can be reduced and the synchronous machine can be configured more compact axially. In addition, costs of the synchronous machine can be reduced.

Besides the magnetic core, the energy transmitter of the synchronous machine can also comprise further components. Accordingly, the energy transmitter can comprise a primary coil, a secondary coil, a rectifier and an inverter. The individual components of the energy transmitter are divided into primary-side or stator-side or stationary components and secondary-side or rotor-side or rotatable components. The magnetic core, the primary coil and the inverter are primary-side or stator-side or stationary components. The secondary coil and the rectifier are secondary-side or rotor-side or rotatable components. The primary coil and the secondary coil can electromagnetically interact with one another. The magnetic core can at least partially encompass or surround the primary coil and thus amplify the electromagnetic interaction between the primary coil and the secondary coil. The magnetic core can be advantageously formed from a ferritic material.

In a further development of the synchronous machine the energy transmitter can comprise a reinforcing element. The reinforcing element, located outside, can include or surround the magnetic core at least partially. The reinforcing element can be firmly connected to the magnetic core in a materially connected and/or positively connected and/or non-positively connected manner. The reinforcing element can protect the magnetic core from mechanical loads and thus increase the lifespan of the magnetic core. The reinforcing element can be formed for example from steel.

Advantageously, the reinforcing element can comprise at least one hollow-cylindrical section. The at least one hollow-cylindrical section of the reinforcing element can lie against the magnetic core and be arranged so as to face the bearing or the bearing shield. In addition it can be provided that the reinforcing element is configured C-shaped and is placed onto the magnetic core. Then, the reinforcing element can include the magnetic core on two sides encircling the axis of rotation and which are coaxial relative to one another and an axial-side of the magnetic core oriented transversely to the axis of rotation. Thus, the magnetic core can be particularly effectively reinforced and protected from mechanical loads.

The bearing can comprise an inner ring non-rotatably arranged on the shaft, an outer ring and at least two rolling elements arranged between the outer ring and the inner ring. The outer ring of the bearing can be in direct contact with the magnetic core or with the reinforcing element described above. The bearing can be firmly connected to the outer ring with the magnetic core or the reinforcing element in a materially connected and/or positive connected and/or non-positively connected manner.

In a further development of the synchronous machine, the energy transmitter can comprise a secondary coil encircling the axis of rotation and a disc carrying the secondary coil. The disc can be oriented transversely to the axis of rotation and non-rotatably connected to the shaft of the rotor group. The secondary coil can be arranged so as to be inductively interactable on a primary coil at least partially encompassed by the magnetic core. The secondary coil can be in particular a coil lying flat on the disc. The secondary coil can be arranged in particular axially adjacent to the primary coil arranged in the magnetic core.

In addition it can be provided that the magnetic core axially projects beyond the bearing on one side. The disc can then radially project into the magnetic core in the region of the magnetic core axially projecting beyond the bearing. Thus, the secondary coil arranged on the disc can be arranged—in particular axially adjacently—on the primary coil which is at least partially encompassed by the magnetic core.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
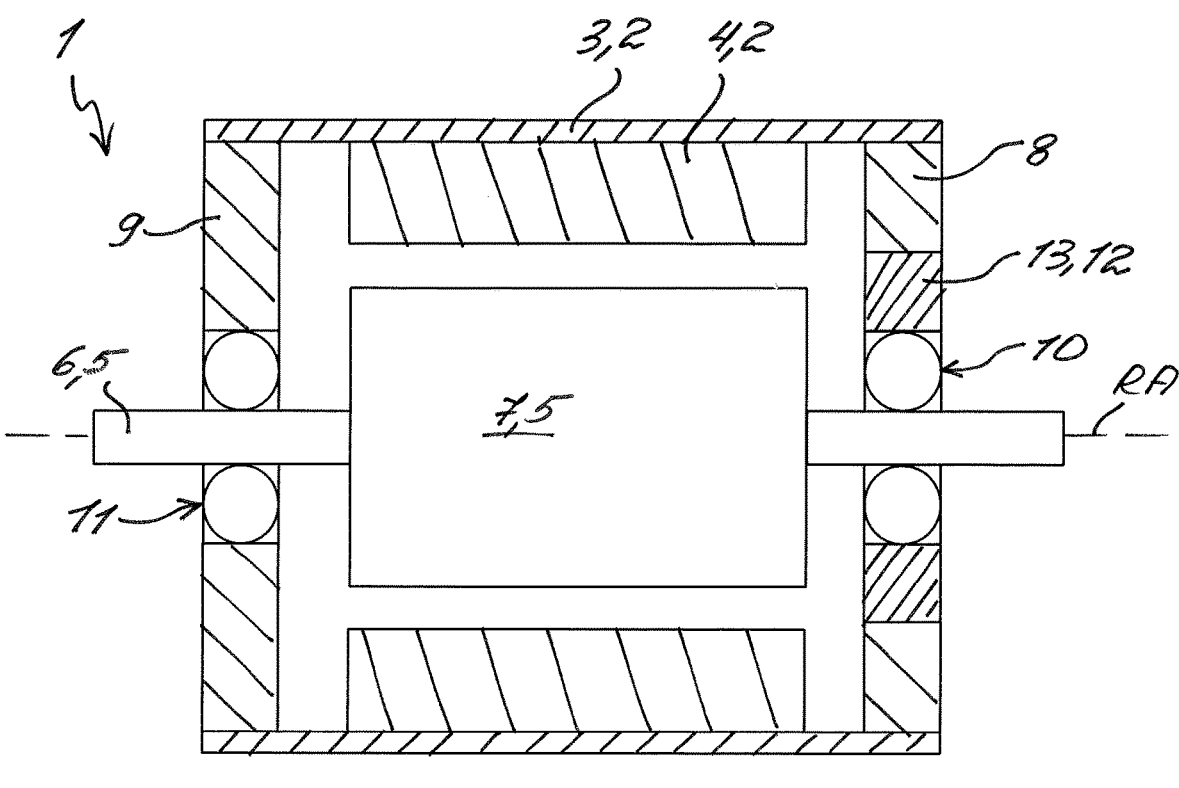
FIG. 1: a sectional view of a synchronous machine according to the invention.

FIG. 1 shows a sectional view of an inductively electrically excited synchronous machine 1 according to the invention. The synchronous machine 1 comprises a stator group 2 with a housing 3 and a stator 4, wherein the stator 4 is non-rotatably received in the housing 3. In addition, the synchronous machine 1 comprises a rotor group 5 with a shaft 6 and a rotor 7, wherein the rotor 7 is non-rotatably connected to the shaft 6. The rotor group 4 is rotatably arranged about an axis of rotation RA in the stator group 2. The rotor 7 is arranged radially adjacent to and spaced apart from the stator 4, so that the rotor 7 and the stator 4 can electromagnetically interact with one another.

The synchronous machine 1 additionally comprises a bearing shield 8 and a second bearing shield 9, which close the housing 3 of the stator group 2 at axial ends of the synchronous machine 1 transversely to the axis of rotation RA. In addition, the synchronous machine 1 comprises a bearing 10 and a second bearing 11, which rotatably receive the shaft 6 of the rotor group 5 at the axial ends of the synchronous machine 1. The second bearing 11 is fixed in the second bearing shield 9. Fixing the bearing 10 in the bearing shield 8 is explained in more detail in the following.

Further, the synchronous machine 1 comprises an energy transmitter 12. On the primary-side, the energy transmitter 12 comprises a primary coil—not shown here—and a magnetic core 13. It is to be understood that the energy transmitter 12 can also comprise further primary-side components. The magnetic core 13 is hollow-cylindrical and encompasses or encloses the primary coil at least partially. The magnetic core 13 can be formed from a ferritic material. The magnetic core 13 is arranged radially between the bearing 10 and the bearing shield 8 and firmly connected to these. Thus, the magnetic core 13 partially reproduces the bearing shield 8 or is integrated in the bearing shield 8.

Advantageously, the energy transmitter 12 is space-savingly arranged in the synchronous machine 1. Thus, the synchronous machine 1 can be configured axially more compact and costs of the synchronous machine 1 be reduced.

Figure 2:
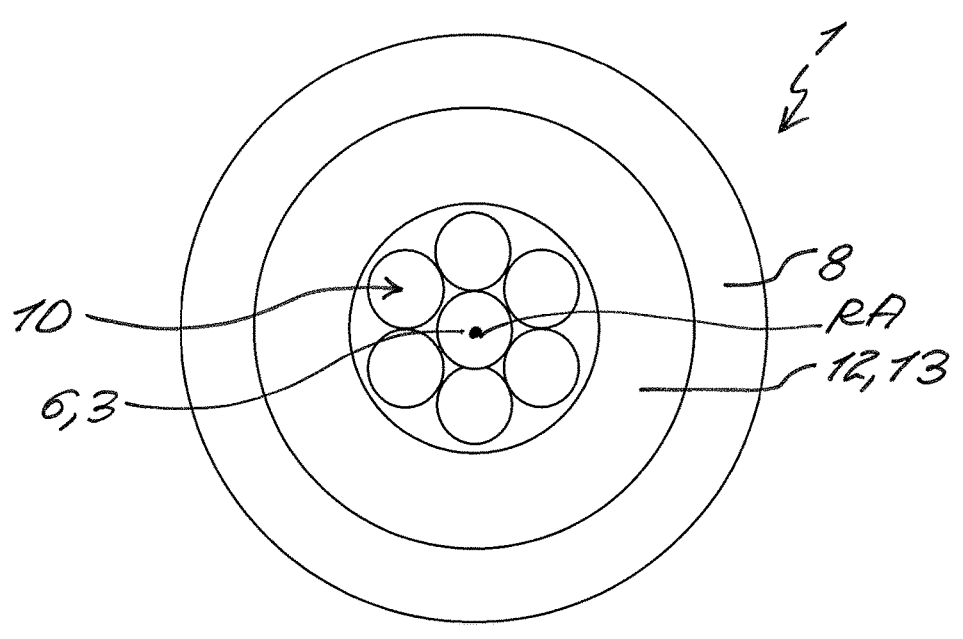
FIG. 2: a plan view of the synchronous machine according to the invention.

FIG. 2 shows a plan view of the synchronous machine 1 according to the invention. Here it is particularly well noticeable that the magnetic core 13 is arranged between the bearing 10 and the bearing shield 8 and is in direct contact with these. The magnetic core 13 can be firmly connected to the bearing 10 and the bearing shield 8 in a materially connected and/or positively connected and/or non-positively connected manner.

Figure 3:
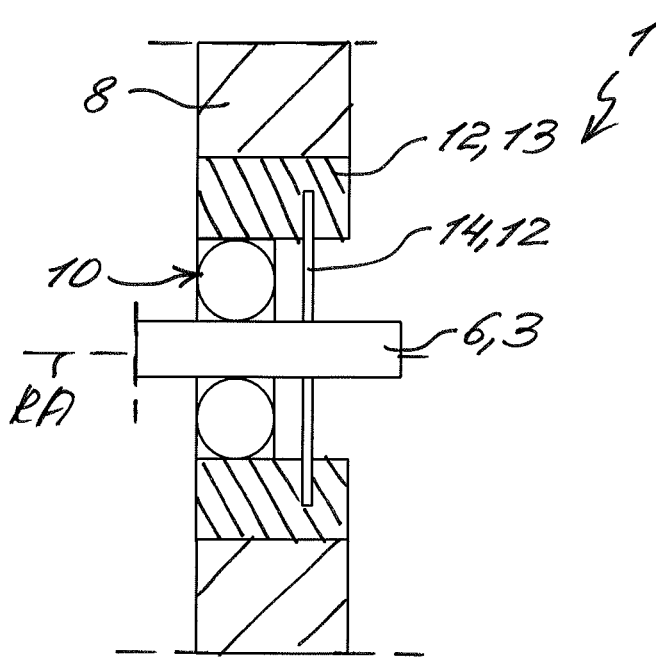
FIGS. 3 & 4: sectional views of the synchronous machine according to the invention in the region of a bearing shield.

FIG. 3 shows a sectional view of the synchronous machine 1 according to the invention in the region of the bearing shield 8. According to FIG. 3, the energy transmitter 12 comprises a secondary-side disc 14 and a secondary coil—not shown here—arranged on the disc 14. However it is to be understood that the energy transmitter 12 can also comprise further secondary-side components. The magnetic core 13 axially projects beyond the bearing 10 towards the outside and the disc 14 projects radially into the magnetic core 13. Thus, the secondary coil can be arranged on the disc 14 so as to be axially adjacent to the primary coil in the magnetic core 13. Together, the primary coil and the secondary coil form a transformer.

Figure 4:
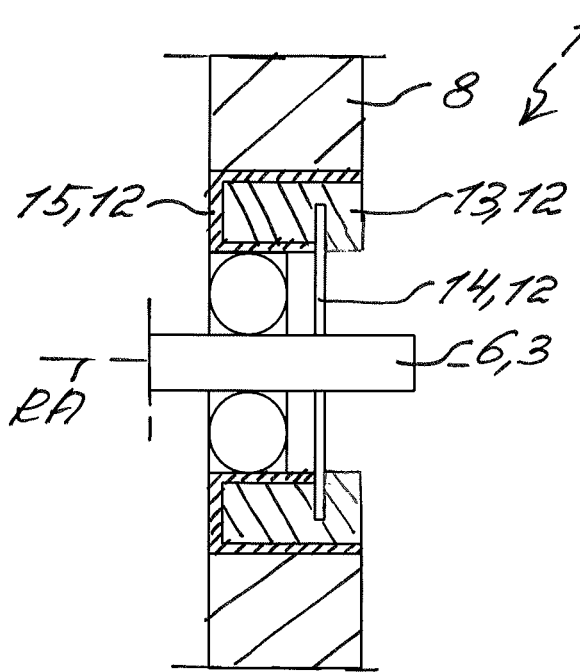

FIG. 4 shows a sectional view of the synchronous machine 1 according to the invention in the region of the bearing shield 8. Differing from FIG. 3, the energy transmitter 12 here comprises a reinforcing element 15. Advantageously, the reinforcing element 15 can be formed of steel. The reinforcing element 15 is C-shaped and encompasses the magnetic core 13 on two sides that are coaxial relative to one another and an axial-side oriented transversely to the axis of rotation RA. Thus, the reinforcing element 15 reinforces the magnetic core 13 of a softer ferritic material so that the magnetic core 13 can better withstand the mechanical loads.

The invention claimed is:

1. An inductively electrically excited synchronous machine, comprising:
   a stator group with a housing and a stator arranged in the housing,
   a rotor group with a shaft and a rotor that is non-rotatably connected to the shaft,
   the rotor group rotatably arranged about an axis of rotation in the stator of the stator group,
   a bearing shield and a bearing fixed in the bearing shield,
   the bearing shield axially closes the housing of the stator group and the bearing rotatably receives the shaft of the rotor group,
   an energy transmitter with a hollow-cylindrical magnetic core, and
   wherein the magnetic core is arranged radially between the bearing shield and the bearing and partially forms the bearing shield.

2. The synchronous machine according to claim 1, wherein the magnetic core is composed of a ferritic material.

3. The synchronous machine according to claim 1, wherein the energy transmitter comprises a reinforcing element, wherein the reinforcing element, located outside, encompasses and reinforces the magnetic core at least partially.

4. The synchronous machine according to claim 3, wherein the reinforcing element is composed of steel.

5. The synchronous machine according to claim 3, wherein:
   the reinforcing element comprises at least one hollow-cylindrical section, and
   the at least one hollow-cylindrical section lies against the magnetic core and is arranged to face the bearing or the bearing shield.

6. The synchronous machine according to claim 3, wherein:

the reinforcing element is configured C-shaped and placed onto the magnetic core, and the reinforcing element encompasses the magnetic core on two sides encircling the axis of rotation and are coaxial relative to one another and an axial side oriented transversely to the axis of rotation.

7. The synchronous machine according to claim 1, wherein the bearing comprises an inner ring non-rotatably arranged on the shaft, an outer ring, and at least two rolling elements arranged between the outer ring and the inner ring.

8. The synchronous machine according to claim 7, wherein the outer ring of the bearing is in direct contact with the magnetic core or with a reinforcing element which, located outside, at least partially encompasses and reinforces the magnetic core.

9. The synchronous machine according to claim 7, wherein:

the energy transmitter comprises a secondary coil encircling the axis of rotation and a disc carrying the secondary coil, the disc is oriented transversely to the axis of rotation and is non-rotatably connected to the shaft of the rotor group, and the secondary coil is arranged to be inductively interactable on a primary coil at least partially encompassed by the magnetic core.

10. The synchronous machine according to claim 9, wherein:

the magnetic core axially projects over the bearing on one side, and the disc radially projects into the magnetic core in a region of the magnetic core axially projecting beyond the bearing.

11. The synchronous machine according to claim 1, wherein:

the energy transmitter comprises a secondary coil encircling the axis of rotation and a disc carrying the secondary coil, the disc is oriented transversely to the axis of rotation and is non-rotatably connected to the shaft of the rotor group, and the secondary coil is arranged to be inductively interactable on a primary coil at least partially encompassed by the magnetic core.

12. The synchronous machine according to claim 11, wherein:

the magnetic core axially projects over the bearing on one side, and the disc radially projects into the magnetic core in a region of the magnetic core axially projecting beyond the bearing.

13. An inductively electrically excited synchronous machine, comprising:

a stator group with a housing and a stator arranged in the housing, a rotor group with a shaft and a rotor that is non-rotatably connected to the shaft, the rotor group rotatably arranged about an axis of rotation in the stator of the stator group, a bearing shield and a bearing fixed in the bearing shield, the bearing shield axially closes the housing of the stator group and the bearing rotatably receives the shaft of the rotor group, an energy transmitter with a hollow-cylindrical magnetic core, and wherein the magnetic core is arranged radially between the bearing shield and the bearing, and wherein the magnetic core partially forms the bearing shield or is integrated in the bearing shield.

14. The synchronous machine according to claim 13, wherein the magnetic core is in direct contact with the bearing and the bearing shield.

15. The synchronous machine according to claim 13, wherein the energy transmitter comprises a reinforcing element that at least partially surrounds the magnetic core.

16. The synchronous machine according to claim 15, wherein the magnetic core is composed of a ferritic material, and the reinforcing element is composed of steel.

17. The synchronous machine according to claim 15, wherein:

the reinforcing element comprises at least one hollow-cylindrical section, and the at least one hollow-cylindrical section lies against the magnetic core and is arranged to face the bearing and/or the bearing shield.

18. The synchronous machine according to claim 15, wherein:

the reinforcing element has a C-shaped structure, and the C-shaped structure of the reinforcing element encompasses the magnetic core on two sides encircling the axis of rotation and are coaxial relative to one another and on an axial side oriented transversely to the axis of rotation.

19. The synchronous machine according to claim 15, wherein the bearing comprises an inner ring non-rotatably arranged on the shaft, an outer ring, and at least two rolling elements arranged between the outer ring and the inner ring.

20. The synchronous machine according to claim 19, wherein the outer ring is in direct contact with the reinforcing element.

* * * * *